Oct. 14, 1924.
C. P. HAGENLOCHER
ROLLER BEARING
Filed Nov. 3, 1919
1,512,006
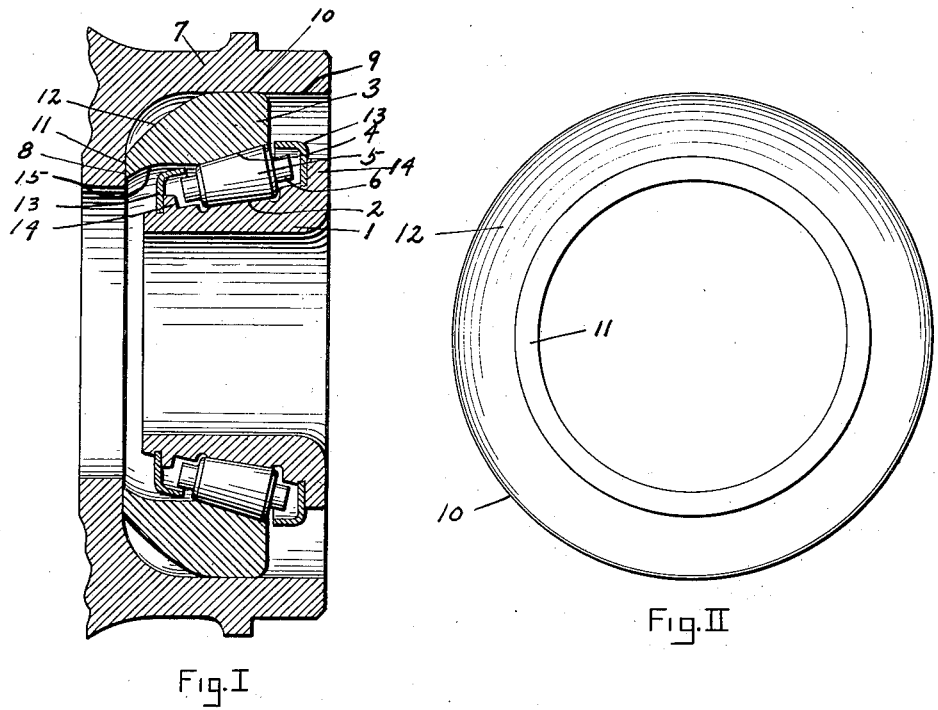
Fig. I
Fig. II
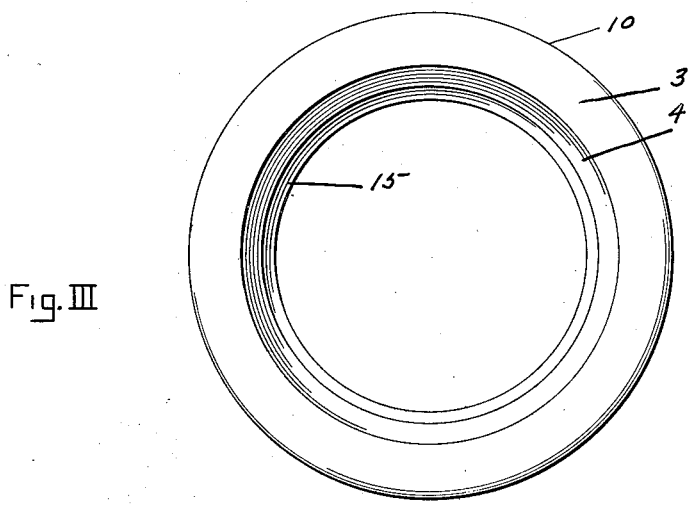
Fig. III
Inventor:
Christian Paul Hagenlocher,
By Chester H. Braselton
Attorney Patented Oct. 14, 1924.

1,512,006

UNITED STATES PATENT OFFICE.

CHRISTIAN P. HAGENLOCHER, OF PHILADELPHIA, PENNSYLVANIA, ASSIGNOR, BY MESNE ASSIGNMENTS, TO THE TIMKEN ROLLER BEARING COMPANY, OF CANTON, OHIO, A CORPORATION OF OHIO.

ROLLER BEARING.

Application filed November 3, 1919. Serial No. 335,404.

*To all whom it may concern:*

Be it known that I, CHRISTIAN PAUL HAGENLOCHER, a citizen of the United States, residing at Philadelphia, Pennsylvania, have invented certain new and useful Improvements in Roller Bearings, of which I declare the following to be a full, clear, and exact description.

This invention relates to improvements in roller bearings.

The principal object of my invention is to provide a roller bearing which is so constructed that it may be satisfactorily used as a replacement for the ball-bearings used in the wheel hubs of a Ford automobile.

Another object of my invention is to provide a roller bearing having two seating surfaces perpendicular to each other and thus permitting the seating of the bearing in a positive manner in the wheel hub of a Ford automobile.

Further objects, and objects relating to economies of material and details of construction, will definitely appear from the detailed description to follow. I accomplish the objects of my invention by the devices and means described in the following specification. My invention is clearly defined and pointed out in the appended claims. A structure constituting a preferred embodiment of my invention is illustrated in the accompanying drawing, forming a part of this specification, in which;

Figure I is a sectional view through a part of a wheel hub and a bearing constructed in accordance with my invention.

Figure II is a plan view of the outer bearing member, looking from the left in Figure I, and Figure III is a plan view of the outer bearing member, looking from the right in Figure I.

In the drawing, similar reference numerals refer to similar parts throughout the several views.

Referring to the drawings, I have shown a roller bearing comprising the inner bearing or cone member 1, having the external conical bearing surface 2, and the outer bearing or cup member 3, having an internal conical bearing surface 4. A plurality of tapered rollers 5 are interposed between and roll upon said bearing surfaces and a retaining pin 6 extends axially from each end of each roller.

This bearing is intended for use as a replacement for the ball-bearings used in the wheel hubs of a Ford automobile and a part of such a hub is shown at 7 in Figure I. This hub has a cup shaped recess to receive the bearing and a plane surface 8 adjacent the edge of the central opening through which the shaft or spindle passes. This surface 8 is perpendicular to the axis of the hub. There is also a cylindrical surface 9, near the outer edge of the cup-shaped recess which is co-axial with the hub and therefore perpendicular to the surface 8. In assembling the bearing in the hub it is essential that the axis of the bearing should coincide with the axis of the hub. To insure such perfect coincidence I provide an external cylindrical surface 10 upon the outer bearing member which seats upon the cylindrical surface 9 of the recess in the hub and assists in bringing the bearing to perfect alinement in the hub. I also provide, on the outer bearing member, a seating surface 11 which lies in a plane perpendicular to the axis of the bearing and is nearly in line with the small ends of the rollers 5. This surface 11 seats on the plane surface 8 in the hub and, together with the surface 10, maintains the bearing in the hub with its axis absolutely coincident with the axis of the hub. The surfaces 9 and 11 of the outer bearing member are connected by the external partly spherical surface 12.

Retaining rings 13 are seated in grooves in the cone member 1 and abut the shoulders 14. The flanges of the retaining rings 13 overhang the ends of the retaining pins 6 and loosely retain the rollers in assembled relation with respect to the inner bearing member. The end of the outer bearing member is substantially in line with the small ends of the rollers and hence I cut away on the inner side of the outer bearing member to provide the cup-shaped surface 12 within which the flange of the retaining ring 13 is housed.

I am aware that the particular embodiment of my invention, which I have described here, is susceptible of considerable variation without departing from the spirit of my invention and hence I desire to claim the same broadly, as well as specifically, as indicated by the appended claims.

Having thus described my invention, what I claim as new and desire to secure by Letters Patent, is:—

1. An anti-friction bearing comprising an inner and an outer bearing ring, a circle of tapered rollers disposed between said rings the outer of which rings is cylindrical in contour throughout a portion of its extent and tapered throughout the remaining portion of its extent said cylindrical and tapered parts forming a juncture and the surface of said tapered portion being so arranged that a plane tangent thereto intersects the axis of a roller and means for retaining said rollers in position.

2. In a combination a hub a part of the inner cylindrical wall of which inclines in a conventional manner toward and terminates in a shoulder, an anti-friction bearing comprising inner and outer rings having a circle of rollers arranged therebetween fitted within said hub, one side of said outer ring snugly fitting the cylindrical wall of the hub, the other side of said ring being substantially cone-frustum shaped, the flat end of said ring being in abutting relation with said shoulder and that portion of the ring between the cylindrical side and flat end being free of the conventional inclined wall of said hub.

In testimony whereof, I affix my signature.

CHRISTIAN P. HAGENLOCHER.